United States Patent Office 3,121,170
Patented Feb. 11, 1964

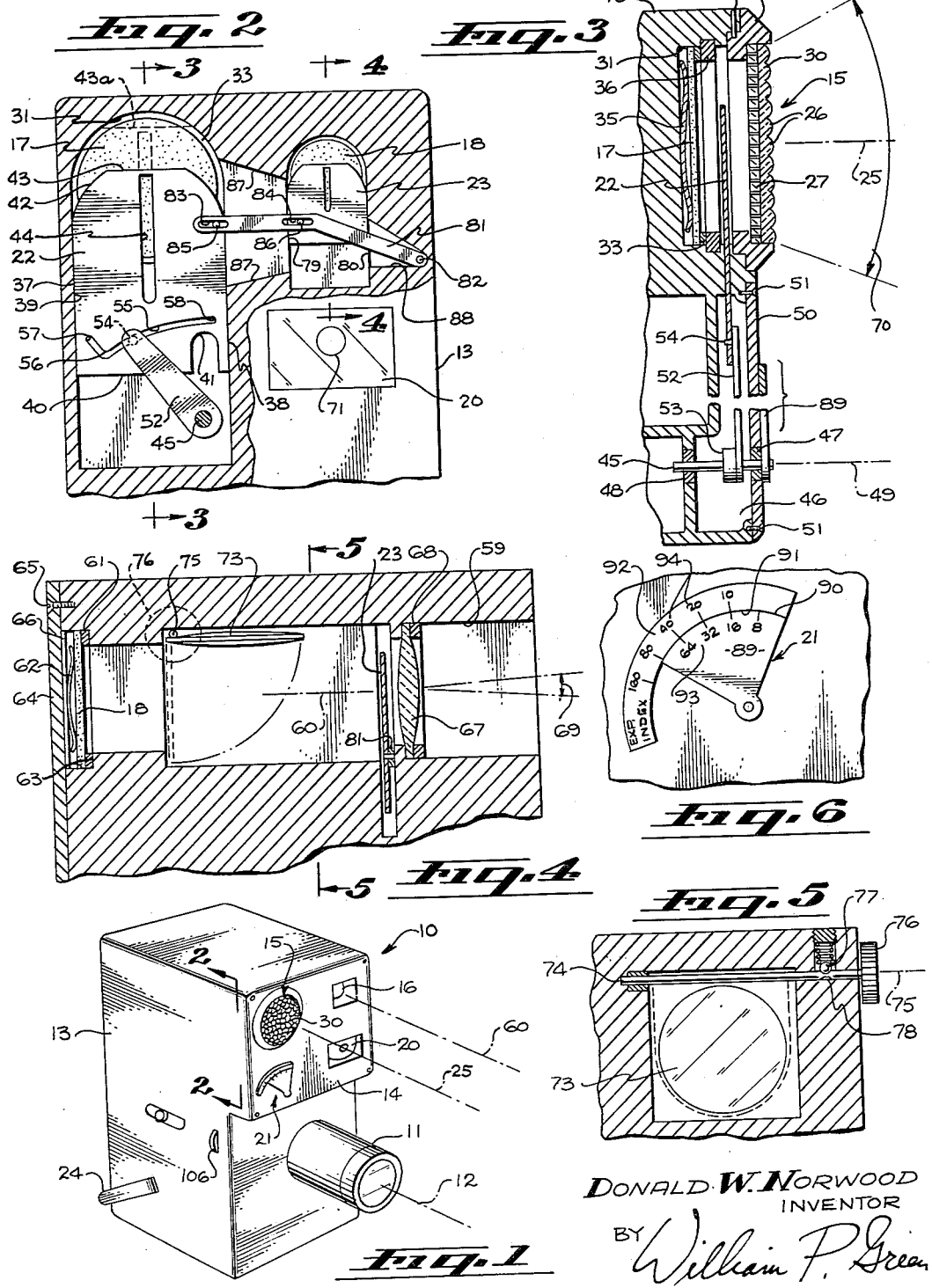

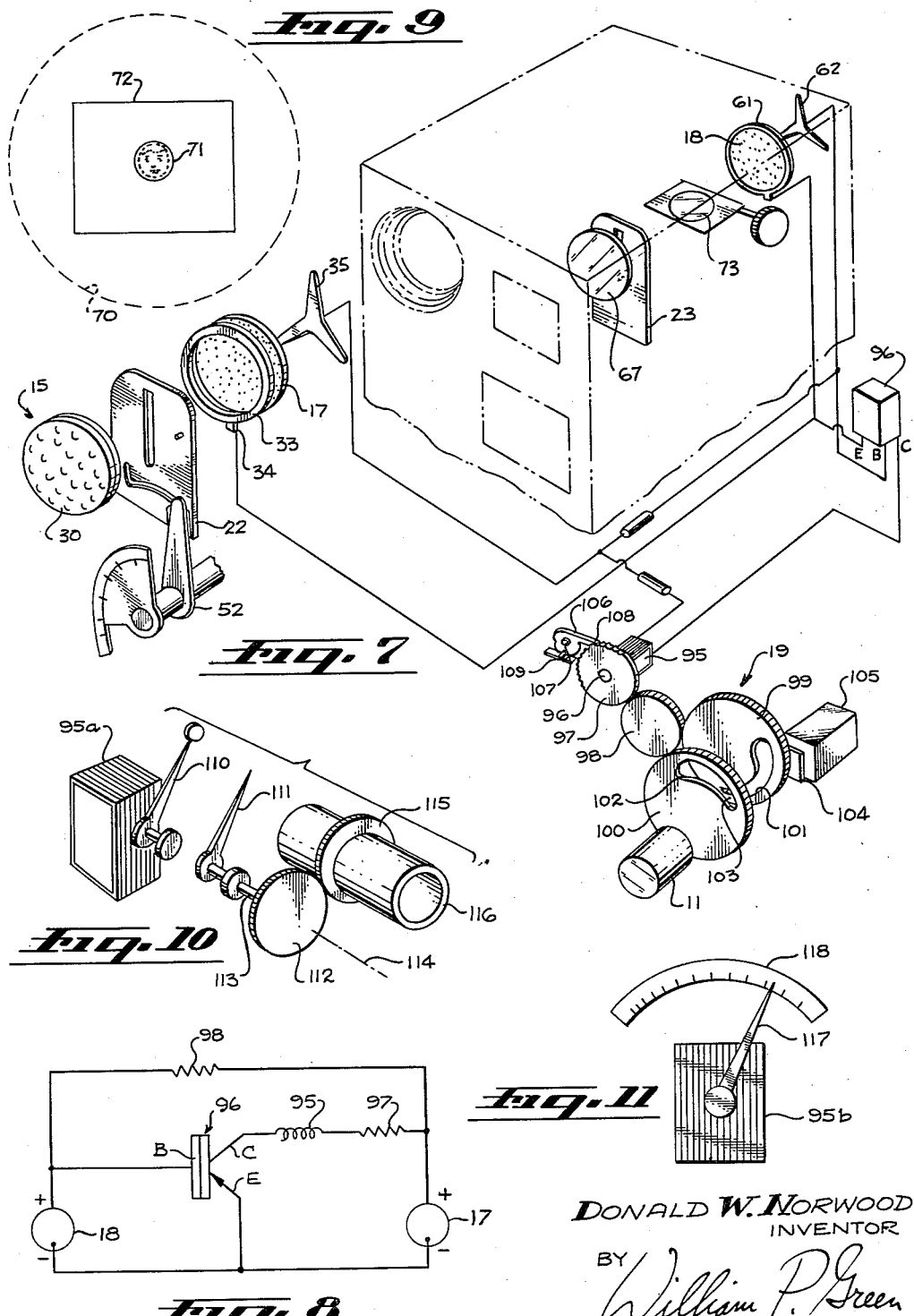

3,121,170
LIGHT RESPONSIVE UNIT HAVING TWO
ACCEPTANCE ANGLES
Donald W. Norwood, 1470 San Pasqual St.,
Pasadena, Calif.
Filed May 16, 1960, Ser. No. 29,341
10 Claims. (Cl. 250—229)

This invention relates to a unique type of light responsive apparatus for determining the exposure settings of a camera. The light responsive apparatus may be used either as a light meter type of device, having an indicator which designates the appropriate settings for a camera, or as an automatic or semi-automatic exposure control system actually built into a motion picture or still camera. Certain features of the devices of the present invention have been disclosed in my prior application Serial No. 857,959 filed December 7, 1959, on "Photographic Device Responsive to Both Incident and Reflected Light," now Patent No. 3,091,166, issued May 28, 1963.

In attempting to optimize the appearance of a photograph to the human eye, it is extremely important that the response characteristics and functioning of the eye itself be given very careful consideration, as major factors involved in determining what will be the ultimate effect produced by viewing of the photograph. The eye is the medium through which both the original scene and the photograph of that scene are viewed. In order for the photograph to attain the best possible representation of the original scene, certain actions of the eye with respect to its own exposure control should be understood, and if possible should be emulated by the camera exposure control apparatus.

In the human eye, different portions of the retina are not at all uniform in their responsiveness to light. On the contrary, the retina is considerably more acute at a small area near its center than at other points. Consequently, in normal viewing, the eyeball is automatically turned to a position in which the principal object in the scene forms an image on the small, acute vision portion of the retina. Other portions of the scene then form images on the other areas of the retina which are less well defined or acute than the image of the principal object on the center of the retina. It should be noted, however, that both the principal object in the foreground of the scene and the background areas influence the adaptation of the eye to the brightness of the scene.

In general photographic practice, there is usually a principal subject in the foreground, and also some type of background for that subject. The principal subject is usually a person, particularly in motion picture photography, in which a large proportion of all film footage is devoted to medium and close-up pictures of the face of an individual. Similarly, in casual snapshot photography, as generally practiced, the principal subject is usually a person, and very often of course a child.

In order to assure the best possible results in a photograph, it is advisable to consider separately both the overall brightness of the face of the principal foreground subject, and the overall brightness of the background areas. In some cases the brightness of each of these, per unit area, may be very similar, as when the scene is front lighted, and both the foreground and background have medium tones. In many other situations, however, the brightness of the foreground and background, per unit area, may be quite different. This is true for example when the subject is backlighted, leaving the face in shadows, while the background is very bright, as where the background may be the sky.

In determining the camera settings for each of these different situations, the proper relative weight must be given to the overall brightness of the foreground subject, which is the object of principal interest, and also to the brightness of the background, which may be considerably larger in area but only of secondary interest. The general object of the present invention is to provide light responsive apparatus which automatically accomplishes this purpose, by responding differently to light reflected from the principal subject than to light reflected from the background area. Preferably, the apparatus is only moderately sensitive to the background light, but is considerably more sensitive to light reflected from the principal foreground subject. The two types of response are automatically combined into an end result which provides optimum photographic exposure for the scene as a whole. Desirably, the entire result is attained without the necessity for using any type of electric battery in the device, and therefore without the danger of introducing errors by virtue of the progressive decrease in strength of such a battery.

Structurally, the device includes two photoelectric cells both of which receive light reflected from the scene to be photographed, but which have light acceptance means associated therewith whose light acceptance angles are purposely made to be considerably different. One cell receives light from a relatively wide acceptance angle covering the width of substantially the entire scene, while the other cell receives light from only a very narrow acceptance angle, which is just wide enough to limit practical acceptance to the principal foreground subject. The outputs from the two cells control an electrical circuit which preferably includes an amplifier acting to give proper relative weights to the small output from the narrow angle cell, and the much larger output from the wide angle cell. The ultimate electrical output may enter a moving coil of the D'Arsonval type, which in turn actuates either a pointer of an exposure meter or semi-automatic camera, or a lens iris mechanism of a fully automatic exposure control camera.

The above and other features and objects of the present invention will be better understood from the following detailed description of the typical embodiments illustrated in the accompanying drawings in which:

FIG. 1 is a perspective view of an automatic motion picture camera embodying the invention;

FIG. 2 is an enlarged fragmentary vertical section taken on line 2—2 of FIG. 1;

FIG. 3 is a further enlarged fragmentary vertical section taken on line 3—3 of FIG. 2;

FIG. 4 is an enlarged fragmentary vertical section taken on line 4—4 of FIG. 2;

FIG. 5 is a fragmentary section taken on line 5—5 of FIG. 4;

FIG. 6 is a fragmentary front view of a portion of the FIG. 1 camera;

FIG. 7 is an exploded partially diagrammatic representation of the electrical circuit of the exposure control apparatus of FIG. 1;

FIG. 8 is a completely diagrammatic representation of the electrical circuit;

FIG. 9 is a view representing the relationship between the two acceptance angles of the apparatus;

FIG. 10 is a fragmentary perspective representation of a semi-automatic camera embodying the invention; and FIG. 11 is a representation of a light meter embodying the invention.

Reference is first made to the first form of the invention shown in FIGS. 1 through 9. The invention in this case takes the form of a fully automatic motion picture camera represented at 10 (see FIG. 1), having the usual lens assembly 11 projecting forwardly to take a picture centered about a main lens axis 12. The housing 13 of the camera may typically be essentially rectangular, as shown, and may have a forwardly projecting light acceptance portion 14 above lens 11. At the location of this portion 14, housing 13 carries a wide angle light acceptance unit 15 and a narrow angle light acceptance unit 16, which direct light onto two separate photoelectric cells 17 and 18 respectively (see FIG. 2). These cells 17 and 18 act through the amplifier circuit represented in FIGS. 7 and 8 to automatically control the iris mechanism 19 (FIG. 7) of the camera. Referring again to FIG. 1, the user views the scene to be photographed through a view finder 20. The camera can be set for different film sensitivities and exposure times (frames per second) by means of a setting control shown at 21 in FIG. 1, which setting control acts to vary the positions of a pair of valves 22 and 23 (FIG. 2) located in the path of light to the two photoelectric cells 17 and 18.

The mechanism contained within body 13 of course includes the usual film advancing mechanism for successively advancing different frames of a motion picture film to a predetermined position of exposure to an image received through lens 11. Also, there is contained within the housing the usual shutter mechanism, power operated in timed relation to the actuation of the film advancing mechanism to open the light path from the lens to each frame of the film when that particular frame is in proper position for exposure. The spring actuated motor for driving the film advancing mechanism and shutter mechanism is windable by the usual winding arm represented at 24.

Light acceptance unit 15 may take the form of any conventional type of unit capable of receiving reflected light from a scene, over a relatively wide acceptance angle, and then directing that light onto an associated photoelectric cell. Unit 15 is illustrated as including a conventional multilenticular circular light acceptance disc 30 centered about and facing along an axis 25 extending substantially parallel to axis 12 of the lens. Disc 30 may be formed of transparent glass, plastic, or the like, molded to present a large number of small convex lens areas 26 facing forwardly along axis 25. Behind disc 30, there may be provided the usual circular honey-combed element 27, containing a large number of parallel axially extending passages through which light is directed in a manner assisting disc 30 in restricting the acceptance angle of the overall unit 15 to a predetermined desired angle.

Parts 30 and 27 may be rigidly cemented or otherwise secured to a retaining ring 28 which ring may be in turn rigidly secured in any manner to housing 13 of the camera, as by a number of circularly spaced retaining pins, one of which is represented at 29 in FIG. 3.

Behind the light acceptance unit 15, housing 13 contains a circular forwardly facing recess 31, within which photoelectric cell 17 is mounted. This cell may be a conventional circular photovoltaic disc, centered about, and having its forward sensitized light sensitive surface facing along, axis 25. Thus, cell 17 acts to produce an output current in response to the impingement of light on the cell from acceptance unit 15.

The electrical connection to the forward sensitized surface of cell 17 is effected by means of an electrically conductive metal ring 33, which engages the periphery of the sensitive surface of the disc. Ring 33 is both externally and internally circular, except for the provision of a short tab 34 (FIG. 7) at one point about its periphery, by which tabs the ring is connected to an electrical lead forming a connection to the rest of the circuit. The electrical connection to the back side of cell 17 is effected by means of a resilient metal electrically conductive spring contact 35 (FIGS. 3 and 7). The electrical leads connecting to contacts 33 and 35 have not been shown in FIG. 3, but it will readily be understood that these leads and all of the other leads which will be discussed at a later point may extend through passages formed in the housing at whatever points prove to be most convenient for forming electrical connections between the different portions of the apparatus. Parts 17, 33 and 35 may all be retained in their illustrated FIG. 3 positions within recess 31 by means of a resilient retaining ring 36 fitting within an annular groove formed in the recess wall.

Axially between the light collector or light acceptance unit 15 and the associated photoelectric cell 17, there is provided the previously mentioned light valve element 22 (FIGS. 2 and 3) for regulating the percentage of the available light (within the predetermined acceptance angle of units 15 and 17) which is permitted to pass from collector unit 15 to cell 17. This valve 22 may take the form of an opaque planar sheet metal plate disposed directly transversely of axis 25, and mounted for sliding movement within the plane of the plate transversely of that axis. When valve 22 is in its uppermost position (broken lines in FIG. 2), a minimum amount of light is permitted to pass the valve and impinge upon cell 32. To pass more light to the cell, valve 22 is slidable downwardly, ultimately to a completely open position in which no portion of disc 17 is covered by the valve.

Referring to FIG. 2, the valve plate 22 has two vertically extending parallel opposite side edges 37 and 38 which are spaced apart in correspondence with the width of a vertical guideway 39, within which plate 22 is mounted for only vertical movement. The bottom of plate 22 may be defined by a horizontal bottom edge 40 having a cutaway at 41, while the top of plate 22 is defined by an essentially semi-circular edge 42, which is interrupted at 43 by a horizontal top edge defining a chord of the semi-circle represented by edge 42. This semi-circular edge 42 may have a radius corresponding substantially to that of the recess 31 in housing 13, and may be engageable upwardly against the top wall of that recess in the uppermost position of valve 22. In that uppermost position of the valve, the top edge 43 (see broken line position 43a in FIG. 2) is located slightly below the top of the exposed portion of disc 17, to allow some light to pass the valve and impinge upon cell 17 in even the most closed position of the valve. There may also be a vertically extending slit 44 formed in valve plate 22, to allow some additional light to pass the valve and impinge upon the photoelectric cell in the uppermost position of the valve. This slit 44 acts to improve the distribution of light over the area of the cell in the minimum light transmission condition. As the plate 22 is moved downwardly, the effective light passing area of the valve is increased as seen in FIG. 2. As will be apparent, the width of valve plate 22 between its opposite side edges 37 and 38 is slightly greater than the diameter of the exposed portion of the associated cell 17, and corresponds essentially to the diameter of recess 31, and to the diameter of curvature of the upper interrupted arcuate edge 42.

For actuating valve 22 vertically between its maximum closed and maximum open positions, I provide an actuating shaft 45 located within a chamber 46 formed in portion 14 of the housing at a location beneath acceptance unit 15 and photoelectric cell 17. This shaft 45 is journalled by two bearings 47 and 48 for rotation about an axis 49 extending parallel to the main photographic axis 12 of the camera. Chamber 46 may typically be closed at its forward side by a removable front wall or plate 50, secured to the rest of the housing by screws 51.

Within chamber 46, shaft 45 rigidly carries an arm 52, projecting radially of axis 49, and typically having an enlarged hub portion 53 for attaching the arm to the shaft. At its free end, arm 52 carries an axially projecting short pin or lug 54, which is received and confined within a slot 55 in plate 22, in a relation such that swinging movement of arm 52 about axis 49 serves to cam plate 22 upwardly and downwardly.

The slot 55 in valve plate 22 is of the configuration represented in FIG. 2. More specifically, starting from the righthand end of that slot as seen in FIG. 2, the elongated slot first curves gradually downwardly as it advances to the left, and to a point 56 at which the slot returns abruptly upwardly to its other end 57. When arm 52 is in a directly upwardly projecting position, lug 54 is received in the righthand end 58 of slot 55, and the valve plate 22 is in its uppermost position. As arm 52 swings in a counterclockwise direction as viewed in FIG. 2, lug 54 advances along slot 55 toward its other end 57, and in so doing causes the valve 22 to be shifted progressively downwardly. When arm 52 has turned through a 90 degree angle, and reaches a directly horizontally projecting position (projecting to the left in FIG. 2), pin 54 is received within the very end portion 57 of slot 55, and the valve is then in its lowermost position (in which shaft 45 and hub 53 are received within the cutaway or recess formed in the valve 22).

At one side of recess 31 which contains cell 17 and its associated apparatus, the housing 13 of the camera contains an elongated passage or recess 59 (see FIG. 4), centered about an axis 60 extending parallel to axes 12 and 25. This passage 59 contains the second photovoltaic cell 18, located near the back of the housing, and to which electrical connections are made by a ring contact 61 and spring contact 62, corresponding to contacts 33 and 35 of FIG. 3. The parts 18, 61 and 62 may be held in position against a shoulder 63 by means of a removable back wall 64 of the housing, secured to the main body of the housing by screws 65. Contact 62 is of course suitably insulated from wall 64, as by an insulator represented at 66. Cell 18 may be identical with the previously discussed photovoltaic cell 17, except that cell 18 is normally somewhat smaller in size, as shown.

Light is directed onto cell 18 from an acceptance angle which is much narrower than the acceptance angle associated with units 15 and 17 of FIG. 3. For thus restricting the acceptance angle of light directed onto cell 18, there is positioned within passage 59 a lens 67, which may be retained in position in any suitable manner, as by a retaining ring 68. This lens is so designed as to direct onto cell 18 light from a predetermined angle such as that typically represented at 69 in FIG. 4. No other light from the scene being photographed can reach cell 18. Also, the passage 59 contained parts are so located that the narrow acceptance angle from which cell 18 receives light is located at approximately the center of the larger acceptance angle 70 from which cell 17 receives light. This relationship is brought out in FIG. 9, in which the large acceptance angle 70 of cell 17 is represented in broken lines at 71, while the very narrow acceptance angle 69 of cell 18 is defined by the circle 71 at the center of circle 70. The area of the ultimate photograph to be taken is defined by the rectangle 72. In looking through view finder 20, the user of the camera sees the area within rectangle 72, and on that field of vision at a central location there is etched or inscribed a circle such as that shown at 71 in FIG. 9 to indicate to the user which portion of the scene is responded to by cell 18.

In some instances, it is desirable to convert cell 18 for reception of light over an increased acceptance angle. For this purpose, I provide within passage 59 a second lens 73 (FIGS. 4 and 5), which is connected at its upper edge to a horizontal shaft 74 pivoted in the housing for rotary movement about an axis 75 extending transversely of but spaced above axis 60. Shaft 74 carries a knob 76 at the side of the housing, which is manually actuable to swing the lens 73 between its upper retracted full line position of FIG. 4 (entirely out of the path of light between lens 67 and cell 18), and the lower downwardly projecting active broken line position of that figure. When lens 73 is in its active broken line position, the two lenses 67 and 73 function together to direct onto cell 18 light from an acceptance angle which is considerably greater than angle 69 of FIG. 4, and which may typically be great enough to include a representative sample of the entire scene. Lens 73 is releasably retainable in each of its two positions by suitable detenting means, as by a spring pressed ball detent 77 (FIG. 5), engageable with detent notches 78 in shaft 74.

The valve 23 for varying the admission of light to cell 18 may be a vertical opaque plate which is substantially identical with plate 22, except that plate 23 is smaller in view of the fact that the associated light collector lens 67 is itself smaller than light collector lens 15. Plate 23 is mounted for sliding movement within a guideway having opposite guiding edges 79 and 80. Also, valve 23 is connected to valve 22 for movement upwardly and downwardly in correspondence therewith. For this purpose, there is mounted in the housing a lever 81, pivoted to the housing at 82, and having slots 83 and 84 movably receiving pins 85 and 86 attached to the two plates 22 and 23 respectively. The two pin and slot connections and pivot point 82 are so designed that when valve 22 is in its uppermost position, valve 23 is also actuated to its uppermost position, and when valve 22 is in its lowermost position, valve 23 is also in its lowermost completely open position. Similarly, in any intermediate setting, the two valves are always in exactly corresponding positions, such that identical percentages of the respective maximum transmissions are allowed. For passing lever 81 between the locations of the two valves 22 and 23, the housing may contain a narrow slit 87, which is just wide enough to pass lever 81, but will not receive either of the two valve plates 22 or 23, or interfere with the proper guiding of the valve plates for their vertical movement. Similarly, a very narrow slit 88 may be provided at the right side of valve 23 (as viewed in FIG. 2), for permitting the upward and downward swinging movement of lever 81 near its pivot point 82.

To actuate the two valves 22 and 23, there is connected to the forward end of shaft 45, at an exposed location in front of wall 50, a manually movable thin plate like element 89 (FIGS. 3 and 6) which may take the form of a segment of a circle having a peripheral edge 90 received adjacent and movable along an arcuate similarly curved edge 91 formed on a curved element 92 attached stationarily to the front of wall 50. Part 89 is rigidly attached to shaft 45, and carries a series of markings 93 spaced along its peripheral edge and coacting with a series of markings 94 formed on part 92. The markings 93 may represent the photographic exposure factor of shutter time, typically given in terms of different numbers of frames per second, as shown in FIG. 6, in the case of a motion picture camera. Markings 94 may take the form of a film sensitivity scale, representing different film sensitivities typically between ASA 10 and ASA 160. The angular spacing between the different markings 10, 20, 40, 80 and 160 in element 192 should be uniform, typically 15 degrees of spacing between each pair of successive numbers; and the markings 8, 16, 32 and 64 on part 89 may be similarly spaced uniform distances apart, and the same angular distance as the markings 94 (15 degrees). The design of the valves 22 and 23, and the actuating arm 52 and slot 55, is such that, in turning arm 52 through its 90 degree range of movement, the effective light passing area of each of the valves increases in geometric progression steps, while the angular movement of arm 52 advances through only arithmetic progression steps. More specifically, for each 15 degrees of angular movement of arm 52 and element 89, the effective light passing area of each of the valves is doubled. A slot of the type illustrated in FIG. 2 at 55 will attain this result, in conjunction with the fact that, as the arm approaches a horizontally projecting position, the vertical component of movement for each 15 degree actuation of the arm increases progressively.

The electrical output from cells 17 and 18 actuates a conventional moving coil (D'Arsonval) type of electrically actuated microammeter unit 95 (FIG. 7), which in turn actuates the iris mechanism 19 of the camera in accordance with the light energization of the photoelectric cells.

The electrical circuit which includes the cells and moving coil device includes also a transistor 96 (typically a type NPN transistor), which functions to amplify the effect of narrow acceptance angle cell 18 by using that effect to modify the output of the wide acceptance angle cell 17. That is, the output of wide acceptance angle cell 17 is utilized as the primary input current or "power supply" to transistor 96, while the output of cell 18 is utilized as a modulating power source for varying or modulating the current from cell 17. In this way, in the output current fed to controlled unit 95, the effect of the current produced by narrow acceptance angle cell 18 is amplified many times relative to the current from wide acceptance angle cell 17, so that the iris mechanism 19 may be actuated primarily in accordance with the intensity of light within the narrow acceptance angle, and secondarily in accordance with the amount of light within the wider acceptance angle.

To attain this result, the various components are connected in the relationship shown in FIGS. 7 and 8. More particularly the negative side of the cell 17 is connected to the emitter E of the transistor 96, while the positive side of the cell 17 is connected to one side of the fixed resistor 97. The other side of the resistor 97 is connected to one side of the moving coil 95. The other side of the moving coil is connected to the collector C of the transistor. Thus the main power circuit includes cell 17, resistor 97, the moving coil 95, and the CE portion of the transistor, in series, as brought out in FIG. 8. To form the modulating circuit, cell 18 has its negative side connected to emitter E of the transistor 96, and its positive side connected to the base B of the transistor. As will be understood, a relatively small current change in the circuit which includes cell 18 will cause a considerably greater current change in the circuit which includes cell 17, to thereby amplify the effect of cell 18.

It has been noted that it is the nature of some transistors to increase the amplification factor as current flow through the transistor increases. In the present apparatus a relatively constant amplification factor is desired. The achievement of this effect is assisted by means of a branch circuit which extends from the positive side of cell 17 to the positive side of cell 18. This branch circuit includes a high value resistor, 98, typically of a value of 90,000 ohms where the transistor employed is a General Electric type 2N169A transistor. This branch circuit has the effect of boosting the output from cell 18 at low light levels on the cells, which boosting effect tapers off at high light levels to a negligible amount. The fixed resistor 97 in the power circuit, or the use of a moving coil 95 with relatively high internal resistance, typically to give a combined resistance of 1000 to 8000 ohms (preferably about 1500 ohms where the above specified G.E. Transistor is used), also serves to restrain the current flow in the power circuit at high light levels. The net effect of these devices is to maintain at all light levels a satisfactory amplification factor between the modifier circuit and the power circuit.

The moving coil device 95 acts when energized to turn a driven shaft 96 and a carried gear 97. The iris mechanism 19 which is driven by gear 97 may include a second gear 98 meshing with gear 97, and also meshing with teeth formed on the periphery of two iris discs 99 and 100. These discs are mounted to turn about axes which are parallel to one another but offset relative to one another, so that a pair of circularly advancing tapered apertures 101 and 102 in the two discs will coact to form at 103 an aperture whose effective size varies in response to rotation of discs 99 and 100 resulting from actuation of electrically operated unit 95. This type of iris mechanism is illustrated only as one typical form of iris structure which can be employed, it being understood however that any type of electrically operable iris mechanism may be substituted. The light passing aperture 103 formed by the two coacting closely adjacent discs 99 and 100 is aligned with the lens 11 of the camera, so that the image from the lens passes through aperture 103 and then through the usual shutter mechanism diagrammatically represented at 104, and onto a film which is moved into position by the usual film advancing mechanism diagrammatically represented at 105.

In order to allow maintenance of the iris mechanism in a particular set position irrespective of changes in the light energization of the photoelectric cells, I provide a latch element 106 (see FIG. 7), which is pivoted by a shaft 107 for limited rotary movement about an axis typically parallel to axes 12, 25 and 60, and which has an arm 108 whose end is engageable with the teeth of gear 97 to lock the gear against rotation. A suitable spring detent element typically represented at 109 may be provided for releasably retaining the rotatably movable latch element 106 in either its active or released position. The main body portion of latch element 106 may be circular as shown, and have a portion of its periphery projecting outwardly through an aperture in the side of the camera housing 13, as seen in FIG. 1, so that the latch element may be actuated manually between active and released positions by manipulation of this outwardly projecting portion of the latch element.

In using the camera of FIGS. 1 through 9, the operator first actuates element 89 to a setting in which the number on scale 92 representing the film sensitivity of the film in use is directly opposite the number on scale 93 which represents the number of frames per second for which the camera is set. This automatically adjusts the two light valves 22 and 23 for the proper film sensitivity and proper number of frames per second. Assume that converting lens 73 is in its retracted full line position of FIG. 4. The operator then directs the camera toward the scene which is to be photographed, and views the scene through viewfinder 20. In looking at the scene, the operator directs the camera so that the face of the main foreground subject is located within the circle 71 of the viewfinder. The narrow acceptance angle cell 18 will then be responsive to light only from that central area designated by the circle 71, while the second cell 17 will be responsive to light from a much wider acceptance angle, represented by the circle 70 of FIG. 9. With the camera in this position, the two cells 17 and 18 and transistor 96 will actuate moving coil 95 to precisely the proper setting for the lighting conditions that are encountered. By virtue of the amplification of the output of cell 18, by transistor 96, the brightness of the light within the narrow acceptance angle of cell 18 will be the primary controlling factor in determining the setting of the iris mechanism 19, while the background light received by the wide acceptance angle cell 17 will have only a secondary effect. This relationship produces an ultimate photograph having optimum exposure characteristics. The sensitivities and relative sizes of the two cells, as well as the electrical characteristics of the transistor 96 and moving coil 95, are purposely maintained in such relation as to obtain an optimum photographic effect. If it is desired under some circumstances for the two cells both to respond to light from a wide acceptance angle, as for example when photographing only landscape, with no foreground subject, then the auxiliary lens 73 is swung down to its active position, to convert cell 18 to a wide acceptance angle condition. In instances in which it may be desired to first set the camera and then take the picture, the operator may direct the camera toward the scene with the face of the principal foreground subject or other desired object within circle 71, then set latch 106, and then proceed to take the picture with the aris maintained in its preset position.

While the ratio between the wide acceptance angle and narrow acceptance angle of the two cells may of course vary for different cameras, it is presently thought desirable in certain instances to maintain the wide acceptance angle between about 8 and 12 times as great as the narrow acceptance angle, typically about ten times as great. The area defined by the wide acceptance angle, at any particular distance from the device, is for many types of cameras maintained between about 64 and 144 times the area of the narrow acceptance angle at that distance, a preferred ratio of the areas being about 100 to 1. To specify certain actual angles which are considered most desirable, it is thought best to maintain the wide acceptance angle between about 45 and 90 degrees, and the narrow acceptance angle between about 4½ and 9 degrees. In one highly successful arrangement which I have utilized, the wide acceptance angle is 60 degrees (included angle), while the narrow acceptance angle is 6 degrees. The correct relative weights to be allotted to foreground brightness and to background brightness, in exposure control determination, involve esthetic considerations to some extent, and the selected ratio is achieved by pre-design of the elements of the apparatus to attain a particular effect. The factors which may be varied to attain this result are:

(1) Size of wide angle cell and component parts of the cooperating assembly.
(2) Size of narrow angle cell and component parts of the cooperating assembly.
(3) Acceptance angle of the wide angle cell assembly.
(4) Acceptance angle of the narrow angle cell assembly.
(5) Amplification factor of the amplifier.
(6) Fixed resistors may be added to either the modifier circuit or the power circuit.
(7) Internal resistance of the moving coil unit.
(8) Thermistors may be included in the modifier circuit or the power circuit.
(9) Resistance in the branch circuit.

The device is calibrated according to the following formula:

$$f = \sqrt{\frac{S \times t \times B}{K}}$$

wherein:
$f$ = $f$-stop number
$S$ = film sensitivity in ASA Film Exposure Index Number
$t$ = shutter time
$B$ = brightness in candles, per sq. ft.
$K$ = a constant (value 1-1.35)

The instrument is calibrated with both wide and narrow angle cell assemblies facing the same brightness at the same time.

FIG. 10 represents fragmentarily a variational form of the invention in which the camera is semi-automatic, rather than being completely automatic. In this form there is represented at 95a an electrically actuated moving coil device corresponding to that shown at 95 in FIG. 7, and which device has associated with it all of the light acceptance apparatus, photoelectric cells, valves and transistor apparatus shown in FIG. 7, except that unit 95a does not directly actuate the iris mechanism. Instead the unit 95a merely actuates a pointer 110, with which the photographer may align a second pointer 111 by means of a manually actuable gear wheel 112 typically located at the front of the camera. This gear 112 and pointer 111 are mounted by a shaft represented at 113 for rotary adjusting movement about the axis 114 about which pointer 110 turns. Actuation of gear 112 and pointer 111 in turn actuates a meshing gear 115 which operates a conventional iris mechanism within the lens assembly 116 of the camera. The operator uses the camera of FIG. 10 in the same manner as that of FIGS. 1 through 9, except that, when the camera is properly positioned and preset for the taking of a picture, with actuating element 89 preset, then the operator actuates control gear or knob 112 to align pointer 111 axially with the position to which pointer 110 has been turned by light induced electrical actuation of unit 95a, to in this way set the iris mechanism to a setting corresponding to that which is automatically attained by the mechanism 95 of the FIG. 7 arrangement.

FIG. 11 represents diagrammatically a meter device which may be considered to include all of the components illustrated in FIG. 7, except that the moving coil device 95 is not a portion of an automatic or semi-automatic camera, but instead merely actuates a pointer 117, which is movable to different positions along an $f$-stop or other scale 118 from which the operator takes a meter reading for use in setting a camera. The moving coil device itself is represented at 95b in FIG. 11, and is electrically connected into the same cell and amplifier circuit shown in FIG. 7. Also, the valve of FIG. 7 may be employed in the meter device. In taking readings with the meter, the light acceptance units are directed toward the scene in the same manner as when a camera is employed, so that the brightnesses within the two different acceptance angles are considered separately and are added together, with the effect of the narrow acceptance angle light being amplified, to produce an optimum reading on scale 118.

I claim:
1. A device comprising a first light responsive cell; first light acceptance means for directing light from a predetermined relatively wide acceptance angle onto said first cell; a second light responsive cell; second light acceptance means facing in the same general direction as said first acceptance means and positioned and constructed to direct onto said second cell light from a predetermined acceptance angle which is narrower than and is contained within said first acceptance angle; an electrically actuated unit responsive to said cells; an electrical circuit connecting said unit to both of said cells at the same time for actuation simultaneously by both cells; said two cells, said two acceptance means and said circuit being constructed to render said electrically actuated unit more responsive, through said second cell, to a predetermined change in total units of light energy approaching said device within said narrow angle than, through said first cell, to the same change in total units of light energy approaching said device within said wide angle.

2. A device as recited in claim 1, in which said narrow acceptance angle is located near the center of said wide acceptance angle.

3. A device as recited in claim 1, including a viewfinder facing in the same direction as said two acceptance means and constructed to define the area from which said second light acceptance means accepts light.

4. A device as recited in claim 1, including an optical element mounted for movement into and out of the path of light to said second cell and constructed to alter the acceptance angle of said second light acceptance means.

5. A device comprising a first light responsive cell, first light acceptance means for directing light from a predetermined relatively wide acceptance angle onto said first cell, a second light responsive cell, second light acceptance means facing in the same general direction as said first acceptance means and positioned and constructed to direct onto said second cell light from a predetermined acceptance angle which is narrower than and is contained within said first acceptance angle, an electrically actuated unit responsive to said cells, and an electrical circuit connecting said unit to both of said cells at the same time for actuation simultaneously by both cells, said circuit including an amplifier operable to amplify the electrical effect of said second cell relative to the effect of said first cell to thereby relatively increase the effect of said second cell on said unit.

6. A device as recited in claim 5, in which said two cells are photovoltaic cells, said amplifier having said first photovoltaic cell connected thereto as a primary power source fluctuating in accordance with the light energization of said first cell, said amplifier having said second cell connected thereto as a modulating signal to be amplified by the amplifier and modulate the output of said first cell.

7. A device as recited in claim 5, in which said two cells are photovoltaic cells, said amplifier including a transistor having said first photovoltaic cell connected thereto as a primary power source fluctuating in accordance with the light energization of said first cell, said transistor having said second cell connected thereto as a modulating signal to be amplified by the transistor and modulate the output of said first cell.

8. A device comprising a first photovoltaic cell, first light acceptance means for directing light from a predetermined relatively wide acceptance angle onto said first cell, a second photovoltaic cell, second light acceptance means facing in the same general direction as said first acceptance means and positioned and constructed to direct onto said second cell light from a predetermined acceptance angle which is narrower than and is contained within said first acceptance angle, a transistor, means forming a power circuit for said transistor having said first cell connected therein as a primary power source fluctuating in accordance with the light energization of said first cell, means forming a modulating circuit for the transistor having the second cell connected therein so that the output thereof functions as a modulating signal to be amplified by the transistor and modulate the output of the first cell, said power circuit including an electrically actuated unit connected into said power circuit for actuation by the current flowing therethrough, and a branch circuit containing a resistor connected at one side to a point in said power circuit between said first cell and said transistor and at the other side to a point in said modulating circuit between the second cell and said transistor.

9. A device as recited in claim 8, including a second resistor connected into said power circuit.

10. A device comprising a first photovoltaic cell, first light acceptance means for directing light from a predetermined relatively wide acceptance angle onto said first cell, a second photovoltaic cell, second light acceptance means facing in the same general direction as said first acceptance means and positioned and constructed to direct onto said second cell light from a predetermined acceptance angle which is narrower than and is contained within said first acceptance angle, a transistor, means forming a power circuit for said transistor having said first cell connected therein as a primary power source fluctuating in accordance with the light energization of said first cell, means forming a modulating circuit for the transistor having the second cell connected therein so that the output thereof functions as a modulating signal to be amplified by the transistor and modulate the output of the first cell, said power circuit including an electrically actuated unit connected into said power circuit for actuation by the current flowing therethrough, said power circuit containing a resistor connected at one side to said first cell and at the other side to the collector of said transistor through said unit, and a branch circuit containing a second resistor connected at one side to a point in said modulating circuit between the base of said transistor and said second cell, and connected at the other side to a point in said power circuit between said first cell and said unit.

References Cited in the file of this patent
UNITED STATES PATENTS

| | | |
|---|---|---|
| 2,444,674 | Rath | July 6, 1948 |
| 2,482,980 | Kallmann | Sept. 27, 1949 |
| 2,602,861 | Alversheim | July 8, 1952 |
| 2,841,064 | Bagby et al. | July 1, 1958 |
| 2,879,690 | Dunn | Mar. 31, 1959 |
| 2,892,092 | Behr | June 23, 1959 |
| 2,897,720 | Offner | Aug. 4, 1959 |
| 2,932,242 | Greger | Apr. 12, 1960 |
| 2,939,361 | Hock | June 7, 1960 |
| 2,952,778 | Henderson | Sept. 13, 1960 |
| 3,028,499 | Farrall | Apr. 3, 1962 |
| 3,085,226 | Brown | Apr. 9, 1963 |